United States Patent
Park

(10) Patent No.: US 7,431,464 B2
(45) Date of Patent: Oct. 7, 2008

(54) PROJECTION DISPLAY SYSTEM WITH DIFFRACTIVE LINEAR DISPLAY DEVICE

(75) Inventor: Chan Young Park, Gyeonggi-do (KR)

(73) Assignee: LG Electronics, Inc., Seoul (KR)

( * ) Notice: Subject to any disclaimer, the term of this patent is extended or adjusted under 35 U.S.C. 154(b) by 393 days.

(21) Appl. No.: 11/241,690

(22) Filed: Sep. 30, 2005

(65) Prior Publication Data

US 2006/0077530 A1    Apr. 13, 2006

(30) Foreign Application Priority Data

Oct. 4, 2004   (KR) ................. 10-2004-0078667

(51) Int. Cl.
*G03B 21/14* (2006.01)
*G02B 26/06* (2006.01)
*G02B 26/00* (2006.01)

(52) U.S. Cl. ............................ 353/97; 353/99; 359/290

(58) Field of Classification Search ............... 353/97, 353/122, 102, 88–93, 84, 28, 20, 99; 348/740, 348/755–757, 771–774; 359/223, 212, 197, 359/290, 291, 292
See application file for complete search history.

(56) References Cited

U.S. PATENT DOCUMENTS

| | | | |
|---|---|---|---|
| 6,411,425 B1 * | 6/2002 | Kowarz et al. | 359/291 |
| 6,987,616 B2 * | 1/2006 | Tamada et al. | 359/573 |
| 2004/0150869 A1 * | 8/2004 | Kasai | 359/290 |
| 2006/0082857 A1 * | 4/2006 | Song et al. | 359/290 |

FOREIGN PATENT DOCUMENTS

WO    WO 03/085441 A1 * 10/2003

* cited by examiner

*Primary Examiner*—Andrew T Sever
(74) *Attorney, Agent, or Firm*—Workman Nydegger

(57) ABSTRACT

A projection display system in which light use efficiency and image brightness are enhanced by collecting and using substantially all of the light that has been diffracted from a diffractive linear display device without loss of higher-order modes of diffracted light. The projection display system includes a light source, a linear light illumination system that transforms light emitted from the light source into a thin linear light, a diffractive linear display device that modulates the luminous intensity of the thin linear light by selectively diffracting the thin linear light, a mode selection optical system that selectively transmits or filters out the light diffracted by the diffractive linear display device according to the order of the diffracted light, a scanner that scans a linear image projected from the mode selection optical system, and a projection lens that enlarges and projects the image onto a screen.

22 Claims, 6 Drawing Sheets

PROJECTION DISPLAY SYSTEM WITH DIFFRACTIVE LINEAR DISPLAY DEVICE

This application claims the benefit of the Korean Patent Application No. 10-2004-0078667, filed on Oct. 4, 2004, which is hereby incorporated by reference as if fully set forth herein.

BACKGROUND OF THE INVENTION

1. Field of the Invention

The present invention relates to a projection display system, and more particularly, to a projection display system including a diffractive linear display device. Although the present invention is suitable for a wide scope of applications, it is particularly suitable for improving light use efficiency and enhancing brightness of a screen.

2. Discussion of the Related Art

Generally, a projection display system is a display system implementing a wide screen to display a wide image that is generated by projecting and enlarging a small image. An example of a conventional projection display system is an LCD (liquid crystal display) projection system that uses a lamp and an LCD. Such conventional LCD projection display systems create several problems.

For example, the switching response speed of the LCD is relatively low, which can create image artifacts when displaying a fast moving picture. In addition, when the liquid crystal display device operates to render a dark pixel in response to an off value of the electrical signal, the liquid crystal layer of the LCD display device generally is unable to completely block the light of the pixel that should not be illuminated. This dark state light leakage typically reduces the contrast of LCD projection display systems.

Conventional LCD projection display devices typically include optical systems with color separation and combination systems that increase the complexity and overall size of the projection display devices.

The high-temperature high-voltage lamp used as the light source can create safety concerns. In addition, since the expected life span of the lamp is about 5,000 hours, conventional LCD projection systems are not well suited for use in televisions or other products that should have a long life span. Finally, because the lamp has a wide spectrum of light, image color purity is reduced.

To solve these problems, a DMD (digital micro-mirror device), a GLV (grating light valve), or the like can be used in the projection display system instead of LCD. Also, the lamp can be replaced by an LED (light emitting diode), laser, or the like.

Specifically, the GLV, which is a diffractive linear display device, has a configuration of 100 ~10,000 micro-ribbons formed by a semiconductor process. The GLV has a switching response speed much greater than that of the LCD, a contrast higher than that of the LCD and light efficiency better than that of the LCD. Hence, the GLV is more advantageous in implementing brighter images more naturally than the LCD.

FIGS. 1A to 1C are diagrams of a GLV (grating light valve) of a conventional MEMS (micro electromechanical systems) reflective display device. Referring to FIG. 1A, a set of six ribbons 110 and 120 forms one pixel. The ribbons 110 and 120 are alternately arranged. In this case, operational ribbons 120 are moved by an electrode 130, whereas fixed ribbons 110 are not moved by the electrode 130.

The grating light valve includes a linear array of pixels, or a pixel line. Each pixel in the linear array is formed by a set of six ribbons 110 and 120, such as those shown in FIG. 1A. The number of pixels in the linear array of pixels of the grating light valve is generally equal to the number of pixels in one of the two dimensions of the projection display device that uses the grating light valve.

In the GLV, if a voltage is not applied to the electrode 130, as shown in FIG. 1B, a mirror face is formed due to the surfaces of the ribbons being in the same plane. Hence, an incident light is reflected and returns without diffraction as reflected light that is parallel to and in the same path as the incident light.

In the GLV, if a voltage is applied to the electrode 130, as shown in FIG. 1C, the fixed ribbons 110 do not move, but the operational ribbons 120 are bent downward by an electrostatic force. Thus, this configuration of ribbons forms a grating with a periodic step shape in height, which causes diffraction of incident light.

In this case, the luminous intensity of the diffracted light can be modulated by adjusting the height of the displaced operational ribbons 120 or by selecting the time ratio of the up states to the down states of the operational ribbons 120 over a period of time. Hence, the GLV acts as a light modulator that adjusts the luminous intensity of the diffracted light.

FIG. 2 is a diagram of a general projection display system employing the GLV shown in FIG. 1. Referring to FIG. 2, a light emitted from a light source 200 is irradiated as a linear light to a GLV 100 by a linear optical illumination system 300. The light emitted from the light source 200 is a linear light in the sense that it is incident on the GLV 100 along a one-dimensional line that corresponds to the linear shape of the GLV 100.

The GLV 100 selectively diffracts the incident linear light to create a linear diffracted light. The GLV 100 operates in response to an electrical signal that encodes the image data that is to be displayed. The image is created in response to the electrical signal by adjusting the luminous intensity of the diffracted light of each pixel.

The light diffracted by the GLV 100 is passed through a lens 400 and is scanned by a scanner 500 to effectively convert the one-dimensional array of pixels to a two-dimensional array of pixels of a screen 700. A projection lens 600 enlarges the image to and projects the scanned light to the screen 700.

The diffracted light generated by the gratings of the GLV 100 includes a primary diffracted light mode, a secondary diffracted light mode, and higher-order diffracted light modes. Conventional grating light valves 100 use only the primary diffracted light mode, while the secondary diffracted light modes and the other higher-order diffracted light modes are lost. Hence, light use efficiency of conventional GLV projection display systems is relatively low.

Moreover, in the conventional GLV projection display systems, the secondary diffracted light modes and the higher-numbered diffracted light modes are scattered and affect the light path of the primary diffracted light mode, thereby degrading the contrast of the image.

SUMMARY OF THE INVENTION

Accordingly, the present invention is directed to a projection display system that substantially obviates one or more problems due to limitations and disadvantages of the related art. The projection display systems of the invention include a diffractive linear display device, such as a grating light valve, that modulates a linear light source by selectively diffracting the linear light in response to an electrical signal that encodes an image.

The diffracted light generated by the diffractive linear display device includes a plurality of diffracted light modes, including a primary diffracted light mode and other odd-numbered modes which have most of the luminous intensity of the image. In contrast with conventional projection display systems that use diffractive linear display devices, the projection display systems of the invention use substantially all of the light that is diffracted from the diffractive linear display device, including the primary diffractive light mode and higher-order odd-numbered diffracted light modes. As a result, the light use efficiency of the projection display systems can be significantly higher than the efficiencies experienced in prior art systems.

In addition, the projection display systems of the invention absorb or otherwise filter out the secondary diffracted light mode and higher-order even-numbered diffracted light modes. This process reduces dark state leakage and improves the contrast of the images generated using the projection display systems of the invention compared to that which has been possible using prior art systems.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1A:
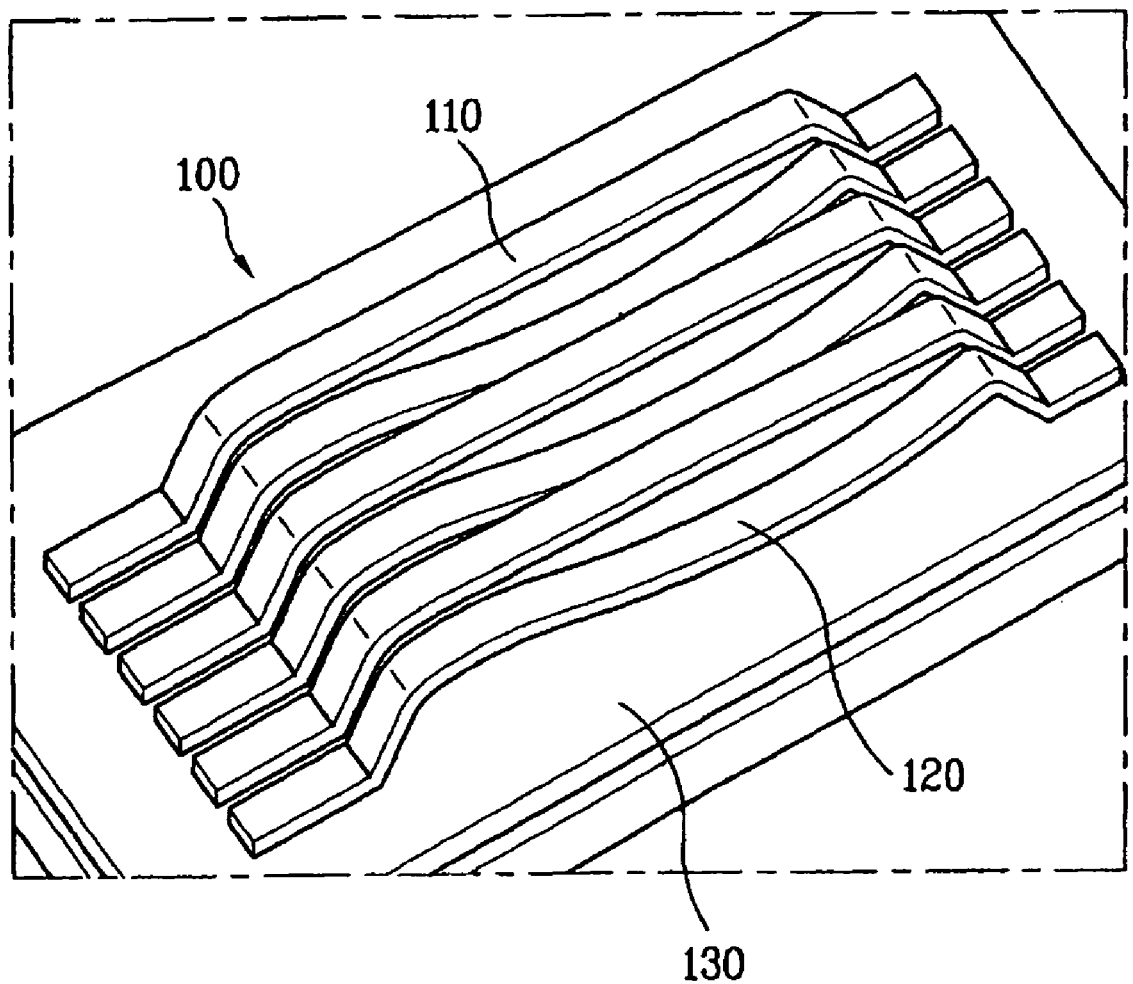
FIGS. 1A to 1C are diagrams of a GLV (grating light valve) of a conventional MEMS (micro electromechanical systems) reflective display device.
Figure 1B:
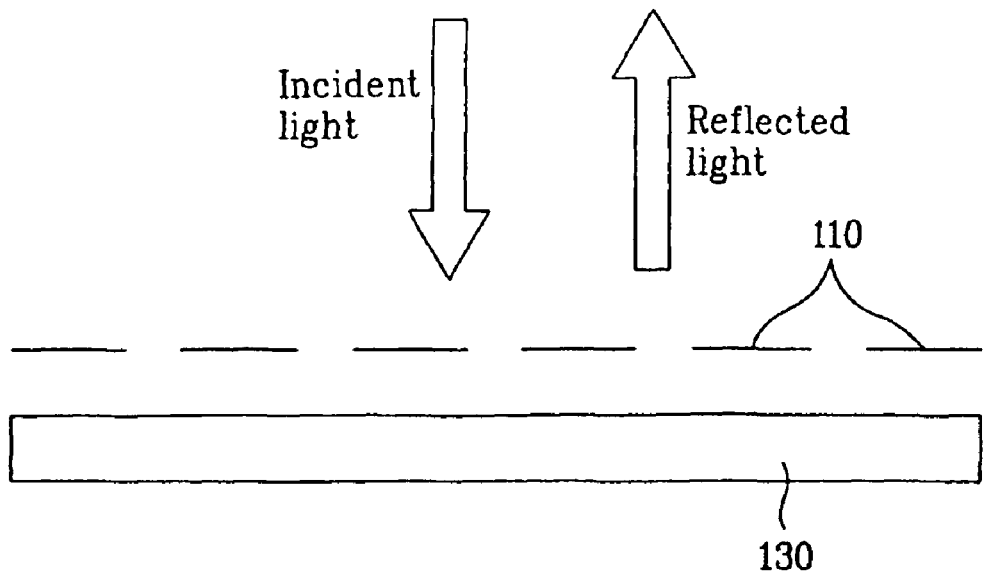
Figure 1C:
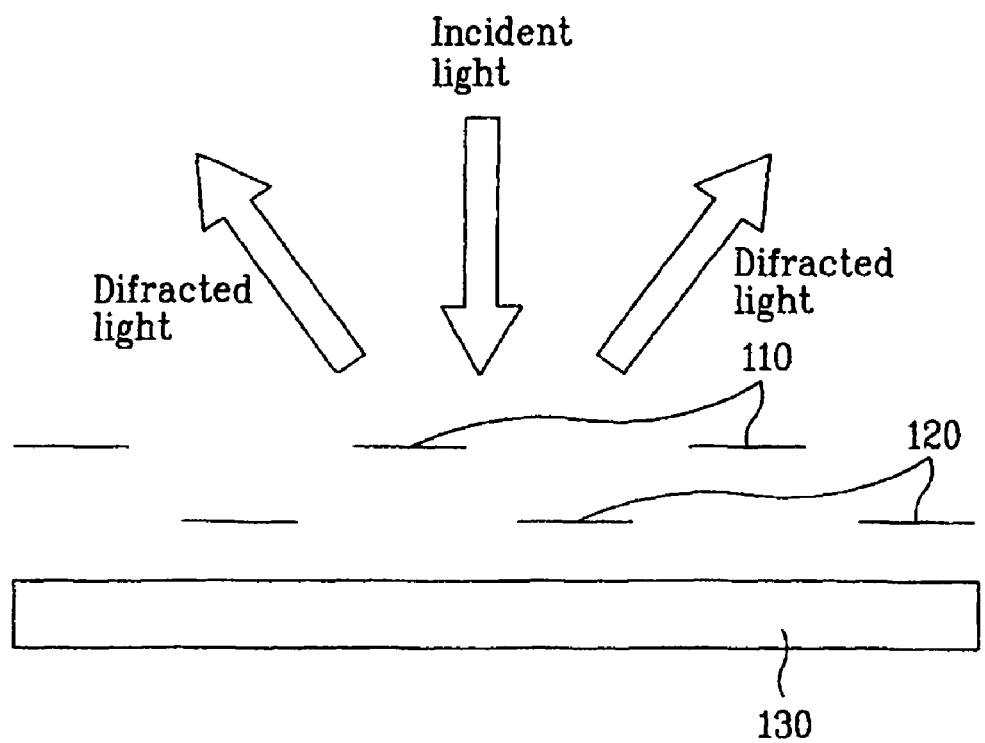
Figure 2:
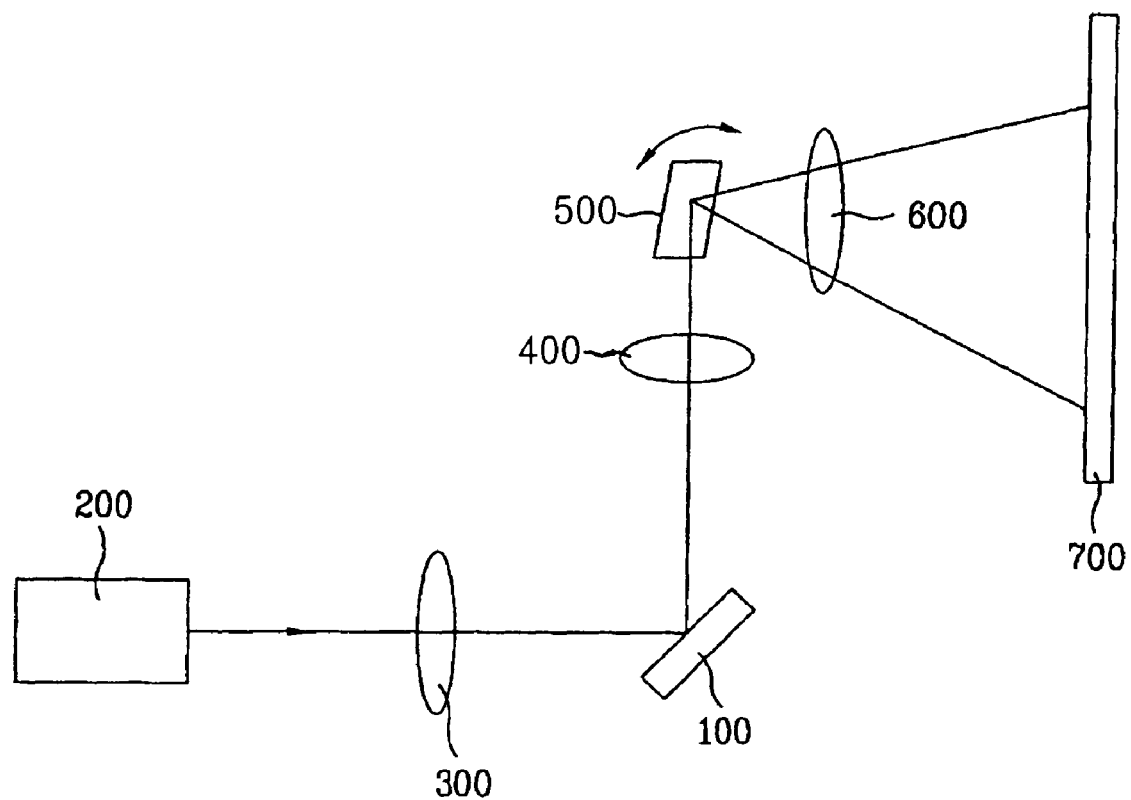
FIG. 2 is a diagram of a conventional projection display system employing the GLV shown in FIG. 1.
Figure 3:
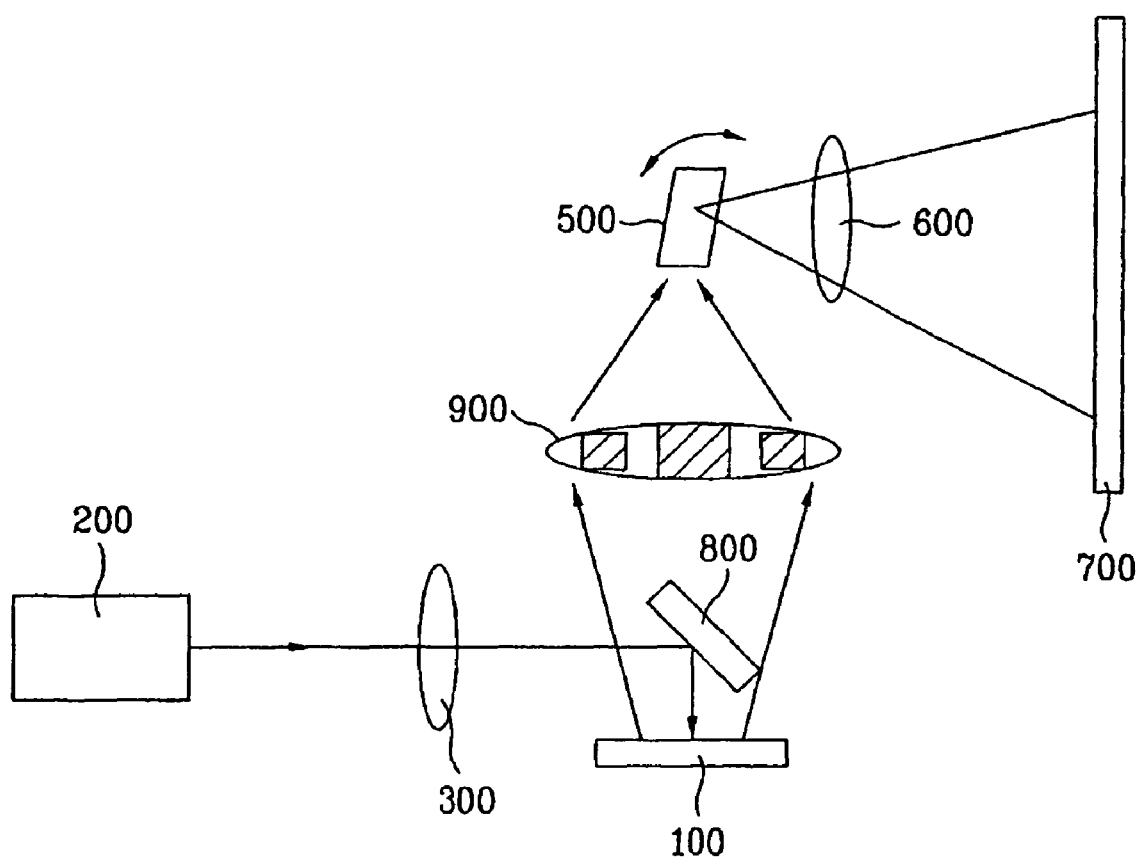
FIG. 3 is a diagram of a projection display system employing a diffractive linear display device according to the present invention.

Reference will now be made in detail to the preferred embodiments of the present invention, examples of which are illustrated in the accompanying drawings. Wherever possible, the same reference numbers will be used throughout the drawings to refer to the same or like parts. FIG. 3 is a diagram of a projection display system employing a diffractive linear display device according to the present invention.

Referring to FIG. 3, a projection display system according to the present invention includes a light source 200, a linear optical illumination system 300 transforming a light emitted from the light source 200 into a thin linear light, a diffractive linear display device 100 that modulates the luminous intensity of the light by selectively diffracting the light projected from the linear light illumination system, a mode selection optical system 900 collecting light diffracted by the diffractive linear display device 100 according to the diffraction mode order of the diffracted light, a scanner 500 scanning a linear image projected from the mode selection optical system 900, and a projection lens 600 that enlarges and projects the image scanned by the scanner 500.

In this embodiment of the invention, the diffractive linear display device 100 is configured to modulate the luminous intensity by reflecting incident light when the data associated with the pixel corresponds to an off value (i.e., no voltage applied) or by diffracting the incident light with a diffraction grating when the data associated with the pixel corresponds to an on value (i.e., a voltage is applied). The diffractive linear display device 100 may include a GLV (grating light valve).

The mode selection optical system 900 selectively transmits several diffracted light modes of various orders, respectively. In doing so, the mode selection optical system 900 improves light use efficiency and enhances contrast by using multiple modes of diffracted light.

Moreover, the diffractive linear display device 100 generates an image on a two-dimensional screen by forming an image of one line on the screen and by sequentially implementing an image on a neighboring line as the scanner 500 scans the linear image generated by the diffractive linear display device 100.

The operation of the above configured projection display system according to the present invention is explained with reference to the accompanying drawing as follows. First, the light emitted from the light source 200 passes through the linear light illumination system 300 so as to be transformed into a thin linear light.

The transformed linear light is then reflected by a mirror 800 that is tilted at 45° with respect to the direction of the incident light, and is directed onto the diffractive linear display device 100. The diffractive linear display device 100 then generates a linear image that corresponds to one line of pixels of the screen 700. In this case, the diffractive linear display device 100 may include a GLV (grating light valve) or the like, for example.

The diffractive linear display device 100 performs a different function in response to electrical signals that have an on or off value. In particular, the diffractive linear display device 100 acts as a mirror to reflect the incident light directly if the electrical signal is not applied thereto (i.e., the electrical signal has an off value). If the electrical signal is applied to the diffractive linear display device 100 (i.e., the electrical signal has an on value), the diffractive linear display device 100 forms a periodic diffraction grating to diffract the incident light.

In doing so, the light, which is diffracted by the diffractive linear display device 100 to which the electrical signal is applied, is split into diffracted light modes of various orders according to the shape of the diffraction grating. The various light modes diffracted by the diffractive linear display device 100 propagate by specific angles such that they are incident on the mode selection optical system 900 that is situated at the next stage of the projection display system.

The mode selection optical system 900 then selectively transmits the diffracted light according to the diffraction mode order of the diffracted light and propagates the selectively transmitted light to the scanner 500.

Figure 4:
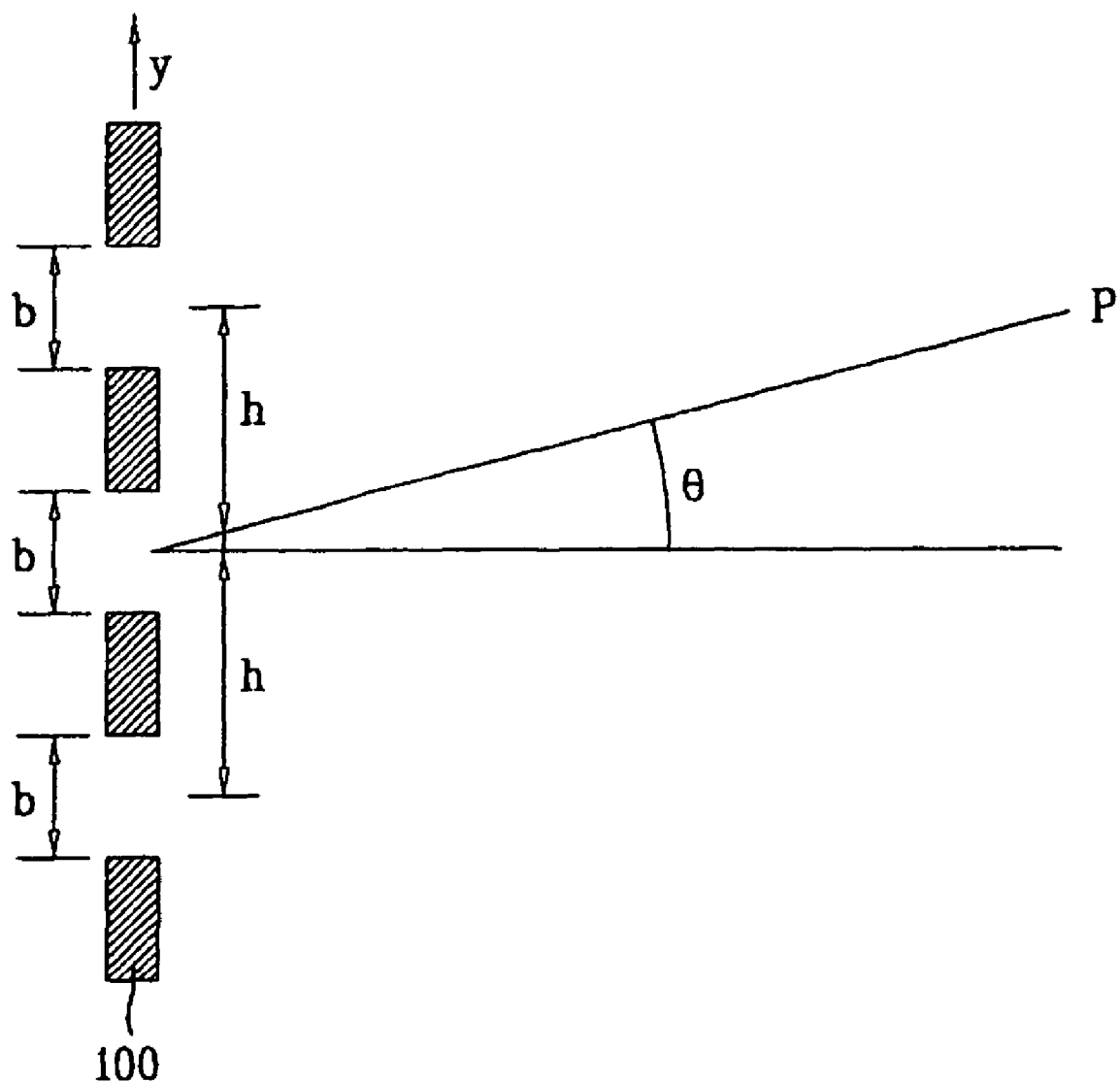
FIG. 4 is a diagram that illustrates various aspects of the diffraction of light by a diffraction grating in a diffractive linear display device according to the present invention.

A method of selectively transmitting the light according to the diffraction mode order in the mode selection optical system 900 is explained in detail as follows. FIG. 4 is a diagram that illustrates aspects of light that has been diffracted by a diffraction grating in a diffractive linear display device according to the present invention. Referring to FIG. 4, a diffraction grating includes N parallel slits that are spaced apart from each other with a pitch 'h' and forms a periodic grating. In this case, each of the slits has a width 'b'.

A wave function $U_p$ of a light diffracted at a point P is shown in Equation 1:

$$U_p = \int_A e^{iky\sin\theta} dy = \int_0^b + \int_h^{h+b} + \int_{2h}^{2h+b} + \ldots + \int_{(N-1)h}^{(N-1)h+b} e^{iky\sin\theta} dy$$

$$= \frac{e^{iky\sin\theta} - 1}{ik\sin\theta} \cdot \frac{1 - e^{iNky\sin\theta}}{1 - e^{iky\sin\theta}}$$

$$= be^{i\beta} e^{i(N-1)\gamma} \left(\frac{\sin\beta}{\beta}\right)^2 \left(\frac{\sin N\gamma}{N\gamma}\right)^2,$$

[Equation 1]

where $$\beta = \frac{1}{2}kb\sin\theta \text{ and } \gamma = \frac{1}{2}kh\sin\theta$$

A distribution I for the angle of the diffracted light is shown in Equation 2:

$$I = I_0 \left(\frac{\sin\beta}{\beta}\right)^2 \left(\frac{\sin N\gamma}{N\gamma}\right)^2,$$

[Equation 2]

where $I_0$ is an intensity of light when $\theta = 0$.

Hence, band-type diffraction patterns appear in bright and dark regions on a plane that includes the point P and is orthogonal to the optical axis.

In this case, the bright patterns appear at $\gamma = n\pi$, $n = 0, 1, 2, \ldots$ Namely, the bright patterns appear at $$\gamma = \frac{1}{2}kh\sin\theta = n\pi, n = 0, 1, 2 \ldots$$

and the dark patterns appear at $$\gamma = \frac{1}{2}kh\sin\theta = \frac{n}{2}\pi, n = 0, 1, 2 \ldots.$$

In this case, a zero-order diffracted light mode among the light modes diffracted by the diffractive linear display device 100 corresponds to the light that is not diffracted. Namely, the zero-order mode represents the light that is reflected from the diffractive linear display device 100 in a direction parallel to the incident light and returns to the light source.

Because the zero-order mode is reflected back to the light source, the primary diffracted light mode has the greatest luminous intensity among the light modes diffracted by the diffractive linear display device 100. Moreover, the secondary diffracted light mode corresponds to the dark pattern immediately adjacent to the primary diffracted light mode. Thus, the diffracted light of the odd-numbered modes forms the bright pattern, whereas the diffracted light of the even-numbered modes forms the dark pattern. As the order of the modes increases, the luminous intensity of the diffracted light decreases.

Conventional projection display devices use only the primary diffracted light mode and lose the luminous intensity associated with higher-order odd-numbered diffracted light modes. Moreover, in conventional projection display devices, the scattering of light causes a small amount of light to exist at the even-numbered modes of the dark regions of the diffracted light pattern. Accordingly, the contrast of the conventional projection display device is reduced.

In the present invention, the mode selection optical system 900 is located at a position of the projection display device next to the diffractive linear display device 100. Thus, substantially all of the odd-numbered diffracted light modes, which represent a first set of the diffracted light modes, are allowed to pass through the mode selection optical system 900. In contrast, even-numbered diffracted light modes, which represent a second set of the diffracted light modes, are filtered out by the mode selection optical system 900. Hence, the present invention can increase the light efficiency and can enhance the screen brightness and contrast.

Figure 5A:
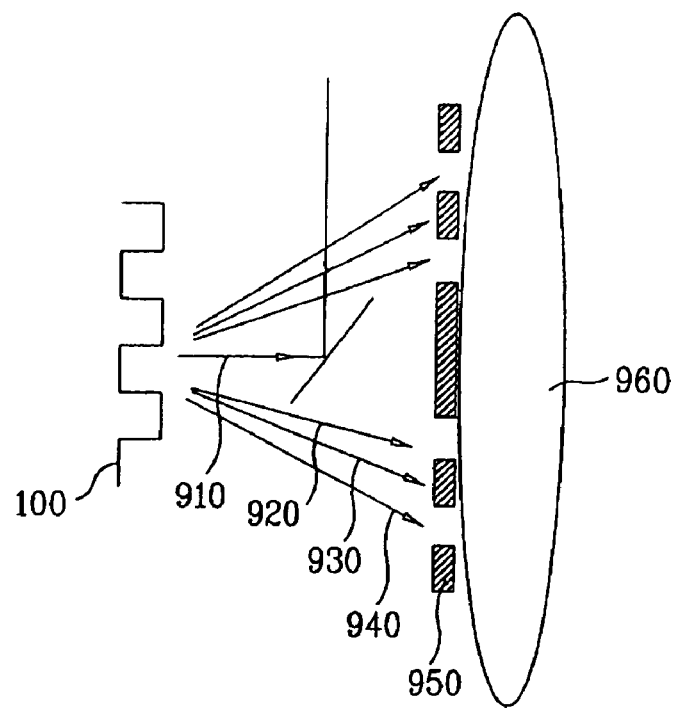
FIG. 5A and FIG. 5B are diagrams of a mode selection optical system of a projection display system according to the present invention.
Figure 5B:
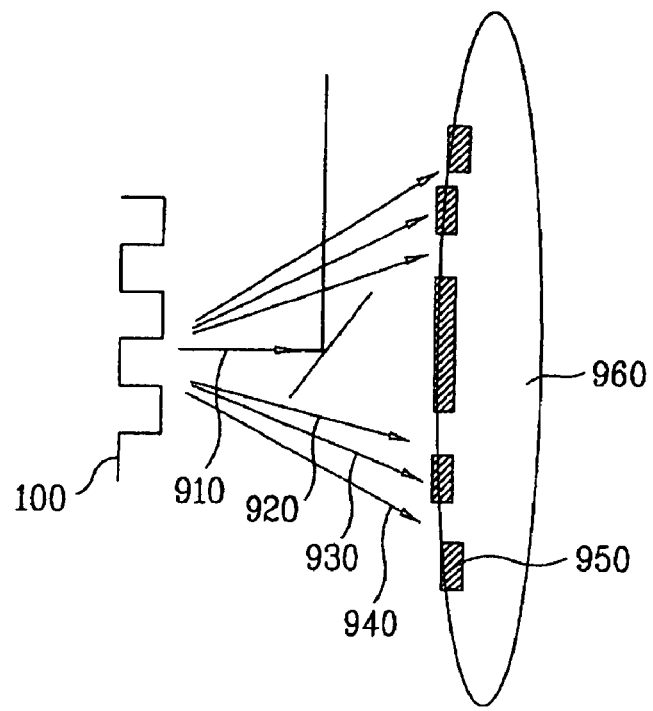

FIG. 5A and FIG. 5B are diagrams of a mode selection optical system of a projection display system according to the present invention. Referring to FIG. 5A and FIG. 5B, a mode selection optical system of a projection display system according to the present invention includes a mask 950 having a diffraction grating including a plurality of parallel slits that are spaced apart from each other with a predetermined pitch by a plurality of lands. Each of the slits of the grating selectively transmits a particular diffraction mode order. Each of the lands of the grating selectively absorbs or otherwise filters out a particular diffraction mode order. The mode selection optical system further includes a lens 960 that collects the light that has been transmitted through the mask 950 according to the diffraction mode order.

In particular, a zero-order diffracted light mode 910 that has been diffracted by the diffractive linear display device 100 is reflected by the mirror 800 and propagates back in the direction of the light source. Hence, the zero-order diffracted light mode 910 does not propagate toward the lens 960.

As shown in FIG. 5A and 5B, an opening, or slit, of the mask 950 is positioned in the direction of propagation of the primary diffracted light mode 920. This slit of the mask 950 transmits the primary diffracted light mode 920 through the mode selection optical system 900, which propagates to the scanner and other downstream components of the projection display system.

As shown in FIG. 5A and 5B, a closed portion, or land, of the mask 950 is positioned in the direction of propagation of the secondary diffracted light mode 930. This land of the mask 950 filters out or otherwise absorbs the secondary diffracted light mode 930, such that it is not transmitted through the mode selection optical system 900.

Moreover, another opening, or slit, of the mask 950 is positioned in the direction of propagation of the tertiary diffracted light mode 940. This slit of the mask 950 transmits the tertiary diffracted light mode 940 through the mode selection optical system 900, which propagates to the scanner and other downstream components of the projection display system.

Thus, the mask 950 associated with the lens 960 that is positioned to correspond to the angles and directions of propagation of the diffracted light modes of the various orders is able to select the corresponding diffraction mode orders that are to be transmitted and filtered out.

The mask 950, as shown in FIG. 5A, can be configured to be a thin plate in front of the lens 960 and to be separated from the lens 960. Alternatively, the mask 950, as shown in FIG. 5B, can be positioned on a surface of the lens 960 so as to be in physical contact with the lens 960.

Thus, by transmitting the diffracted light modes of specific orders by means of the mode selection optical system 900 and by filtering out the other diffracted light modes of the unnecessary orders by means of the mode selection optical system 900, the light use efficiency improves, the brightness of the screen is increased, and the contrast of the screen is enhanced.

In this manner, the diffractive linear display device 100 positioned in front of the mode selection optical system 900 can form a linear image along one row of pixels of the screen 700 of the projection display system in one of the two dimensions of the screen from an inputted video signal. The linear image formed by the diffractive linear display device 100 passes through the mode selection optical system 900 and is then sequentially scanned by the scanner 500, which enables a two-dimensional image to be formed on the screen 700. This image is enlarged and projected onto the screen 700 by the projection lens 600.

Alternatively, in case that an R/G/B light source is used as the light source, three diffractive linear display devices are employed to correspond to the colors, respectively. The projection display system in this embodiment is configured to combine the images of the respective colors.

Accordingly, the projection display system including the diffractive linear display device of the present invention provides the following effects or advantages. First, by selectively transmitting or filtering out the entire orders of the diffracted light modes, the light efficiency can be raised. Second, the brightness and contrast of the screen can be enhanced in this manner.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A projection display system comprising:
   a light source;
   a linear light illumination system that transforms light emitted from the light source into a thin linear light;
   a diffractive linear display device that modulates the luminous intensity of the thin linear light by selectively diffracting the thin linear light emitted from the linear light illumination system;
   a mask that selectively transmits or filters out the light diffracted by the diffractive linear display device according to the diffraction mode order of the diffracted light;
   a lens that collects light transmitted through the mask;
   a scanner that scans an image projected from the mode selection optical system; and
   a projection lens that enlarges and projects the image scanned by the scanner;
   wherein the mask is positioned on a surface of the lens.

2. The projection display system of claim 1, wherein the diffractive linear display device reflects an incident light if a voltage is not applied thereto and diffracts the incident light if the voltage is not applied thereto.

3. The projection display system of claim 2, wherein the diffractive linear display device forms an image of one line on a screen of the projection display system and then sequentially forms another image of a neighboring line of the screen.

4. The projection display system of claim 1, wherein the mask includes a diffraction grating having a plurality of parallel slits that are spaced apart from each other at a predetermined pitch.

5. The projection display system of claim 1, wherein the mask transmits multiple modes of the light diffracted by the diffractive linear display device.

6. The projection display system of claim 5, wherein the mask transmits substantially all of the light diffracted by the diffractive linear display device by transmitting the multiple modes.

7. The projection display system of claim 6, wherein the mask transmits odd-numbered modes of the light diffracted by the diffractive linear display device.

8. The projection display system of claim 5, wherein the mask filters out light that has leaked to even-numbered modes of the light diffracted by the diffractive linear display device.

9. The projection display system of claim 1, wherein the light source comprises R, G and B light sources so that the diffractive linear display device operates with respect to each color of the R, G and B light sources.

10. The projection display system of claim 1, wherein the diffractive linear display device comprises a grating light valve.

11. A mode selection optical system for use in a projection display system, comprising:
    a grating that:
       selectively permits a first set of modes of light diffracted from a diffractive linear display device of the projection display system to be transmitted through the mode selection optical system; and
       selectively filters out a second set of modes of the light diffracted from the diffractive linear display device; and
    a lens that collects the first set of modes of light that have been permitted to be transmitted by the gratings;
    wherein the grating is positioned on a surface of the lens.

12. The mode selection optical system of claim 11, wherein the grating comprises a plurality of slits and a plurality of lands.

13. The mode selection optical system of claim 12, wherein:
    the plurality of slits are positioned to permit the first set of modes to be transmitted; and
    the plurality of lands are positioned to filter out the second set of modes.

14. The mode selection optical system of claim 13, wherein:
    the first set of modes includes only odd-numbered modes; and
    the second set of modes includes only even-numbered modes.

15. The mode selection optical system of claim 14, wherein a zero-order mode is reflected from the diffractive linear display device of the projection display system back to a light source and does not propagate to the mode selection optical system.

16. The mode selection optical system of claim 11, wherein the diffractive linear display device comprises a grating light valve.

17. In a projection display system that includes a diffractive linear display device and a mode selection optical system, a method for forming a projected image using the projection display system, comprising:
    in response to an electrical signal that encodes an image, operating the diffractive linear display device to modulate a luminous intensity of a linear light generated by a light source by selectively diffracting the linear light;
    at the mode selection optical system, receiving the diffracted light from the diffractive linear display device, including multiple diffracted light modes, such that:
       the mode selection optical system selectively transmits odd-numbered modes of the multiple diffracted light modes; and the mode selection optical system selectively filters out even-numbered modes of the multiple diffracted light modes; and propagating the selectively transmitted odd-numbered modes of the multiple diffracted light modes so as to form a projected image.

18. The method of claim 17, wherein the diffractive linear display device comprises a grating light valve.

19. The method of claim 17, wherein the mode selection optical system operates so as to permit substantially all of the linear light that has been selectively diffracted to be transmitted through the mode selection optical system and to be used to form the projected image.

20. The method of claim 17, wherein a zero-order mode is reflected from the diffractive linear display device of the projection display system back to the light source and does not propagate to the mode selection optical system.

21. The method of claim 17, wherein the mode selection optical system operates so as to substantially prevent light that has leaked to even-numbered modes from passing through the mode selection optical system.

22. The method of claim 17, wherein the mode selection optical system comprises a grating having:

slits that selectively transmit the first set of the multiple diffracted light modes; and lands that selectively filter out the second set of the multiple diffracted light modes.

* * * * *